United States Patent Office 3,404,130
Patented Oct. 1, 1968

3,404,130
POLYURETHANE COATING COMPOSITION
Marnell A. Sigura and Julius P. Bilisoly, Baton Rouge, La., assignors to Esso Research and Engineering Company, a corporation of Delaware
No Drawing. Filed Dec. 7, 1965, Ser. No. 512,220
2 Claims. (Cl. 260—77.5)

ABSTRACT OF THE DISCLOSURE

A coating composition comprising (1) a hydroxylated polymer of a $C_4$-$C_6$ conjugated diolefin or copolymer thereof with a vinyl aromatic hydrocarbon, (2) an organic polyisocyanate in an amount to give a NCO/OH ratio of 1/1 to 2/1 and 0.1 to 1.0 mole of a lower aliphatic alcohol, e.g., methanol.

---

This invention relates to improved polyurethane coating compositions and more particularly to polyurethane coating compositions derived from hydroxylated polymers and to their method of preparation.

It is known to prepare polyurethane plastics wherein an organic polyisocyanate is reacted with an organic compound having one or more reactive hydrogens and which is capable of forming polyurethanes. It is also known that the organic compound containing the reactive hydrogen may be a hydroxylated polymer, particularly one in which the OH groups are primary, e.g., —$CH_2OH$. However, when the resulting polyurethane plastic has been used as a coating composition, it has been difficult to secure good film properties and good shelf stability.

It has now been found, according to this invention, that polyurethane plastics, particularly suited for use as coatings, can be produced by carefully controlling the NCO/OH ratio used in preparing the plastic. It has also been found that additional improvements can be obtained by adding a methoxylated partial hydrolysate of a phenyl silane, such as a mixture of monophenyl and phenylmethyl silane.

It has also been found that the shelf stability of the coating compositions may be increased by the addition of at least 0.1 to 1 mol of alcohol per —NCO group in the polyisocyanate.

In accordance with the present invention the organic polyisocyanate is reacted with a hydroxylated polymer produced in a two-stage process which comprises reacting in a first stage, an unsaturated hydrocarbon polymer, having a molecular weight between 300 and 5000, with carbon monoxide and hydrogen in the presence of a hydrocarbon soluble complex having the formulae:

(1) $M_2(CO)_6(BR_3)_2$ or
(2) $[R'M(CO)_y(BR_3)]_x$ where M is one of the transition metals iron, cobalt or rhodium, preferably cobalt, B is either phosphorus or arsenic, preferably phosporus, R is an alkyl radical containing from 1 to about 20, preferably 1 to 6, carbon atoms and R' represents a pi-bonded conjugated diolefin or allylic structure containing 3 to 6 carbon atoms, $x$ is 1 or 2 and $y$ is 1 or 2 with the proviso that when $x$ is 1 then $y$ is 2 and vice versa. For further details concerning the preparation of these complexes reference is had to Serial No. 256,258 (now U.S. Patent No. 3,310,576) and Serial No. 256,260 (now abandoned) of Mertzweiller and Tenney, both filed February 5, 1963. The subject matter of both of these applications are included herein by reference.

The first stage of the process is effected by intimately contacting the unsaturated polymer with hydrogen and carbon monoxide in ratios between 1 to 1 and 10 to 1, preferably between 1 to 1 and 3 to 1, in the presence of 0.05 to 0.5 wt. percent (as metal based on the weight of the polymer), preferably 0.1 to 0.4 wt. percent of the catalyst complex described above at pressures of from 300 to 2000 p.s.i.g., preferably from 500 to 1200 p.s.i.g., and at temperatures between 275 and 425° F., preferably between 300 and 400° F., for a time between ten minutes and five hours, preferably between 0.5 hour and three hours.

In the second stage the hydrogenation reaction is performed at pressures of from 100 to 3000 p.s.i.g., preferably at pressures between 1000 and 1500 p.s.i.g. and at temperatures between 325 and 450° F., preferably between 375 and 425° F., for a time between 0.5 and six hours, preferably one to two hours, using the same catalyst used in the first stage.

In this manner carbonylation is maximized and hydrogenation is minimized in the first stage and hydrogenation is maximized in the second stage. The product of the first stage is a polyaldehyde containing from 2 to 15 —CHO groups per molecule, while in the second stage the carbonyl groups are hydrogenated and substantially all the residual unsaturation of the polymer is replaced with —$CH_2OH$ groups on the polymer side chains. For further details concerning the preparation of the hydroxylated polymer reference is made to application, Serial No. 307,359, filed Sept. 9, 1963, for Cull, Mertzweiller and Tenney, incorporated herein by reference.

Particularly suitable polymers which are hydroxylated and used to prepare the novel polyurethanes of the present invention are the low molecular weight liquid homopolymers of conjugated diolefins of 4 to 6 carbon atoms, such as polybutadiene and copolymers of butadiene and styrene prepared in accordance with the disclosures of U.S. Patents Nos. 2,762,851 and 2,993,050 to Gleason, both of which are incorporated herein by reference.

In accordance with this invention the hydroxylated polymer prepared as described above is reacted with a suitable organic polyisocyanate such as the aromatic, aliphatic and heterocyclic polyisocyanates. Suitable organic polyisocyanates include ethylene diisocyanate; ethylidene diisocyanate; propylene-1,2-diisocyanate; cyclohexylene-1,2-diisocyanate; m-phenylene diisocyanate; 2,4-toluene diisocyanate; 2,6-toluene diisocyanate; 3,3'-dimethyl-4,4'-biphenylene diisocyanate; p,p',p''-triphenylmethane triisoene diisocyanate; 3,3'-diphenyl-4,4'-biphenylene diisocyanate; 4,4'-biphenylene diisocyanate; 3,3'-dichloro-4,4'-biphenylene diisocyanate; p,p',p''-triphenylmethane triisocyanate; 1,5-naphthalene diisocyanate; furfurylidene diisocyanate or polyisocyanates, in a blocked or inactive form such as the bis-phenyl carbamates of 2,4- or 2,6-toluene diisocyanate; p,p'-diphenyl methane diisocyanate; p-phenylene diisocyanate; 1,5-naphthalene diisocyanate and the like. It is preferred to use the commercially available mixture of toluene diisocyanates which contain 80 percent 2,4-toluene diisocyanate and 20 percent 2,6-toluene diisocyanate or 4,4'-diphenylmethane diisocyanate.

The amount of polyisocyanate used in accordance with this invention is critical and is based on the equivalent amount of NCO required for reaction with each hydroxyl group of the polymer and ranges from one NCO group per OH group to two NCO groups per OH group. If amounts outside this range are used then the resulting coating is relatively soft and the direct and reverse impact resistance are unacceptable.

The hardness and impact resistance of coatings formed from the product of this invention are further increased by adding about 5 to 10 wt. percent of a methoxylated partial hydrolysate of monophenyl and phenylmethyl silanes.

It is also a specific feature of this invention to improve the shelf stability of polyurethane coatings by the addition of a suitable lower molecular weight aliphatic alcohol to the coating composition. The alcohol must be added to the reaction production of the hydroxylated polymer and the polyisocyanate. In this manner it serves to render the unreacted NCO groups inactive during the period of storage. In the application and curing of a surface coating from a hydroxylated-urethane composition so stabilized the primary low molecular weight alcohol is released and the residual NCO groups again become active for cross-linking and/or further reaction with the hydroxyl groups of the hydrocarbon polymer. To achieve this inactivation, or stabilization, it is necessary to employ from 0.1 to 1 mol of alcohol per mol of NCO groups in the isocyanate, preferably 0.5 mol alcohol/mol. NCO. Thus only a small deterioration of properties result. Suitable lower molecular weight alcohols which can be used are the primary alcohols containing the monovalent carbinol group —$CH_2OH$ having from 1 to 12 carbon atoms per molecule, e.g. methanol, ethanol, propanol, butanol, pentanol, hexanol, heptanol, octanol, nonanol, decanol, dodecanol, and the like. The $C_1$ to $C_5$ primary alcohols, i.e. methanol, ethanol, propanol, butanol and pentanol are particularly preferred for use in the present invention. Branched primary alcohols, e.g. isobutanol, 2-methyl-1-butanol, etc. can also be used.

It is also a feature of this invention to further improve the properties, particularly the impact properties, of baked films formed from the coating compositions of this invention by adding thereto a polysiloxane having at least two alkoxy groups. Suitable polysiloxanes useful in this invention are shown graphically below:

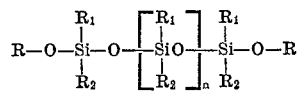

where R is a $C_1$ to $C_4$ alkyl and $R_1$ and $R_2$ are selected from the group consisting of $C_1$ to $C_4$ alkyl, $C_1$ to $C_4$ alkoxyl and $C_6$ to $C_8$ aryl, alkyaryl and aralkyl and $n$ is an integer of from 1 to 4. One method for preparing these polysiloxanes involves reacting a silane or mixture of silanes responding to the general formula $R_nSiCl_{4-n}$ with an alcohol in amount such that the ratio of alkoxy groups to silicon in the reaction product is at least 1. The resulting alkoxylated chlorosilane is then hydrolyzed by adding thereto water in amount sufficient to remove all of the chlorine atoms, or mixed with the same, or other alkyl or aryl chlorosilane before hydrolysis in the ratio of two alkoxylated silanes to 1 to 4 other silanes. Under such conditions only a very few of the alkoxy groups will be hydrolyzed, and the resulting siloxane will contain alkoxy groups in amount approximately equivalent to the alcohol added. During the alcoholysis and hydrolysis steps the temperature is maintained between 30° C. and 35° C. After addition of the water, any volatile materials which may be present are removed by distillation.

Any alkoxy radical, such as for example, methoxy, ethoxy and butoxy, may be employed in the process, but in any case it is preferred that the polysiloxane have a minimum of two alkoxyl groups.

The resulting alkoxylated polysiloxanes are mobile liquids. For the purposes of this invention the R groups on the siloxane may be saturated aliphatic radicals containing less than seven carbon atoms, such as methyl, ethyl, propyl, butyl, cyclohexyl, and cyclopentyl radicals, or monocyclic aryl radicals such as phenyl, chlorophenyl, tolyl, and xylyl. Specific examples of polysiloxanes which are suitable for use in this invention include trimethyl triphenyl dimethoxy trisiloxane, dimethyl triphenyl trimethoxy trisiloxane, trimethyl triphenyl dibutoxy trisiloxane and the like.

The process of the invention broadly comprises mixing the organic isocyanate with the hydroxylated polymer, said hydroxyl groups being reactive with the cyanate groups. There is no critical order of addition, reaction temperature or reaction time involved in this process. In order to minimize side reactions, however, it is desirable to maintain the temperature of the reactants below about 100° C. The exotherm of the reaction mixture is usually below about 100° C. and therefore no cooling of the reaction mixture is necessary.

In a practical embodiment, coating compositions can be prepared by reaction of an organic polyisocyanate with the hydroxylated polymers with or without the further addition of the silane and lower alcohol, as described above, and if desired in an inert solvent. Any inert organic solvent suitable for urethanes may be used such as, for example, xylene, ethyl acetate, toluene, benzene, ethylene glycol monoethyl ether acetate, Cellosolve acetate, butyl acetate, methyl ethyl ketone, methylisobutyl ketone, and the like. The resulting coating composition can be applied in any suitable manner as by dipping, brushing, roller coating, spraying and the like. Any suitable substrate may be coated with the compositions of this invention such as wood, paper, porous plastics, metals, such as steel, aluminum, copper and the like. The coating compositions need not contain a solvent for all applications. If desired, they may contain any suitable pigment such as, for example, iron oxide, carbon black, titanium dioxide, zinc oxide, chrome green, lithol red, etc. The especially interesting features of these coatings are the stability of the urethane linkage, the high impact resistance and shelf stability.

The following examples are presented as specific illustrations of the present invention. All quantities described in this specification and the appended claims as "parts" or "percent" refer to parts by weight unless expressly stated otherwise.

Example 1

25 grams of a hydroxylated low molecular weight (about 460) polybutadiene, 41.7% NVM in benzene, having a hydroxyl number of 211 and an acid number of 1.68 was diluted further with 11.09 grams of methyl isobutyl ketone. To this solution was added various amounts (calculated as —NCO/—OH ratio) of toluene-2,4-diisocyanate (TDI) and films were laid down on Q panels and baked for thirty minutes at 350° F. Similar films were formed from commercially available urethane coatings. The following data were obtained:

|  | Resin of this invention |  |  |  | Commercial urethane coatings |  |
|---|---|---|---|---|---|---|
| NCO/OH ratio | 0.8/1 | 1/1 | 2/1 | 4/1 | Coating A | Coating B |
| Pencil hardness | H | 3H | 2H | 3H | 2H | 3H |
| Flex. 1/8" mandrel | Pass | Pass | Pass | Pass | Pass | Pass |
| Impact: |  |  |  |  |  |  |
| Direct | 15 | 160 | 30 | 20 | 160+ | 160+ |
| Reverse | <5 | 150 | <5 | <5 | 160+ | 160+ |

The above data show that only those coatings prepared from the polyurethanes prepared in accordance with this invention in which the NCO/OH ratio in 1/1 approach in impact properties those prepared from commercial urethanes and that only those having an NCO/OH ratio between 1/1 and 2/1 are acceptable.

Example 2

21.3 grams of the same lot of hydroxylated low molecular weight polybutadiene as used in Example 1 was diluted by the addition of 1.54 grams (10%) of dimethyltriphenyltrimethoxytrisiloxane (Sylkyd 50). Sylkyd 50 is a methoxy polysiloxane having an average molecular weight of 473, contains an average of 3 methoxy groups per molecule, and has an average chemical formula represented by the structure:

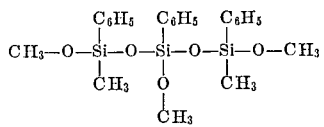

To this solution was added 13.25 grams of methyl isobutyl ketone and 3.41 grams of toluene-2,4-diisocyanate (NCO/OH 1/1). Films were laid down on Q panels and baked for thirty minutes at 350° F. The following data were obtained.

|  | Polyurethane resin | Polyurethane resin with 10% of Sylkyd 50 |
| --- | --- | --- |
| Hardness | 3H | 3H |
| Flex. 1/8" mandrel | Pass | Pass |
| Impact: | | |
| Direct | 160 | 160+ |
| Reverse | 150 | 160+ |

The above data show that the inclusion of about 10% of a polysiloxane to the polyurethane coatings of this invention improves the impact resistance so that the coatings are the equal of those prepared from the best commercial urethane coatings.

Example 3

To a portion of the hydroxylated low molecular weight polybutadiene-TDI mixture used in Example 1 was added 5% methyl alcohol (0.5 mol methyl alcohol per mol TDI). The resulting solution was laid down as a film on Q panels and baked for thirty minutes at 350° F. The following data were obtained:

|  | Without MeOH | | With MeOH | |
| --- | --- | --- | --- | --- |
| Age of sample | 2 hours | 118 hours | 2 hours | 36 days |
| Condition of sample | Fluid | Viscous | Fluid | Fluid |
| Hardness | 3H | H | 4H | 4H |
| Flexibility 1/8" mandrel | Pass | Pass | Pass | Pass |
| Impact: | | | | |
| Direct | 160 | 15 | 160+ | 160+ |
| Reverse | 150 | <5 | 160+ | 160+ |

The above data show that the addition of methyl alcohol to the coating composition of this invention greatly extends the shelf life of the coating composition.

The advantages of the present invention having been thus fully set forth and specific examples of the same given what is claimed as new, useful and unobvious and desired to be secured by Letters Patent is:

1. A storage stable coating composition prepared by:
   (A) preparing a polyurethane by reacting (a) a hydroxylated polymer of a $C_4$ to $C_6$ conjugated diolefin or a copolymer thereof with a vinyl aromatic hydrocarbon said polymer or copolymer having a molecular weight between 300 and 5,000 and (b) an organic polyisocyanate in an amount sufficient to give a ratio of —NCO to —OH groups of 1/1 to 2/1, and
   (B) adding to (A) 0.1 to 1.0 moles per mole of free —NCO on said polyurethane of a monohydric lower aliphatic alcohol having 1 to 12 carbon atoms and 5 to 10 wt. percent of a polysiloxane having the formula:

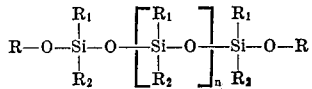

where R is an alkyl group having 1 to 4 carbon atoms, $R_1$ and $R_2$ are selected from the group consisting of (i) alkyl groups having 1 to 4 carbon atoms, (ii) alkoxy groups having 1 to 4 carbon atoms, and (iii) aryl, alkylaryl or aralkyl groups having 6 to 8 carbon atoms, and $n$ is an integer from 1 to 4.

2. The coating composition of claim 1 in which the polysiloxane is a methoxy polysiloxane having an average molecular weight of 473, contains an average of 3 methoxy groups per molecule, and has an average chemical formula represented by the structure:

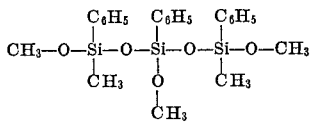

References Cited

UNITED STATES PATENTS

| 2,762,851 | 9/1956 | Gleason | 260—669 |
| 2,801,990 | 8/1957 | Seeger et al. | 260—75 |
| 2,877,212 | 3/1959 | Seligman | 260—77.5 |
| 2,884,388 | 4/1959 | Hedlund | 260—3 |
| 2,968,647 | 1/1961 | Koenecke et al. | 260—77.5 |
| 2,993,050 | 7/1961 | Gleason et al. | 260—290 |
| 2,995,531 | 8/1961 | Hudson | 260—18 |
| 3,154,597 | 10/1964 | McWhorter | 260—824 |
| 3,285,949 | 11/1966 | Siebert | 260—465.4 |
| 3,308,170 | 3/1967 | Pritchett et al. | 260—632 |
| 3,338,861 | 8/1967 | Mastin et al. | 260—33.6 |

OTHER REFERENCES

Saunders et al., Polyurethanes—Chemistry & Technology (part II, pages 485–490), inclusive.

DONALD E. CZAJA, *Primary Examiner.*

F. McKELVEY, *Assistant Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,404,130                              October 1, 1968

Marnell A. Segura et al.

It is certified that error appears in the above identified patent and that said Letters Patent are hereby corrected as shown below:

In the heading to the printed specification, line 3, "Sigura" should read -- Segura --.

Signed and sealed this 3rd day of March 1970.

(SEAL)
Attest:

Edward M. Fletcher, Jr.                        WILLIAM E. SCHUYLER, JR.
Attesting Officer                                    Commissioner of Patents